(12) United States Patent
Oono

(10) Patent No.: US 9,331,912 B2
(45) Date of Patent: May 3, 2016

(54) VIOLATION SIGN CONDITION SETTING SUPPORTING SYSTEM, VIOLATION SIGN CONDITION SETTING SUPPORTING METHOD, AND VIOLATION SIGN CONDITION SETTING SUPPORTING PROGRAM

(75) Inventor: Mitsuhiro Oono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 335 days.

(21) Appl. No.: 13/823,694

(22) PCT Filed: Nov. 11, 2011

(86) PCT No.: PCT/JP2011/076054
§ 371 (c)(1),
(2), (4) Date: Mar. 14, 2013

(87) PCT Pub. No.: WO2012/067031
PCT Pub. Date: May 24, 2012

(65) Prior Publication Data
US 2013/0198380 A1 Aug. 1, 2013

(30) Foreign Application Priority Data
Nov. 17, 2010 (JP) .................... 2010-256830

(51) Int. Cl.
*H04L 12/24* (2006.01)
*G06F 11/34* (2006.01)
(Continued)

(52) U.S. Cl.
CPC ........ *H04L 41/5009* (2013.01); *G06F 11/0709* (2013.01); *G06F 11/0754* (2013.01); *G06F 11/3452* (2013.01); *H04L 43/16* (2013.01); *Y02B 60/165* (2013.01)

(58) Field of Classification Search
CPC .............. H04L 41/0631; H04L 41/147; H04L 41/5009–41/5016; H04L 43/065; H04L 43/08; H04L 43/0876; H04L 43/16; H04L 12/2419; G06F 11/0709; G06F 11/0754; G06F 11/3452; G06F 11/0748; G06F 11/0751

USPC .............. 702/181; 705/1.1; 706/12; 709/224; 714/47.2, 48, 746, 37; 719/318
See application file for complete search history.

(56) References Cited

U.S. PATENT DOCUMENTS

2010/0067391 A1* 3/2010 Chang et al. .................. 370/252
2012/0134532 A1* 5/2012 Ni et al. ....................... 382/103
2014/0122691 A1* 5/2014 Simhon et al. ................ 709/224

FOREIGN PATENT DOCUMENTS

JP 2005285040 A 10/2005
JP 200653728 A 2/2006
(Continued)

OTHER PUBLICATIONS

The international search report for PCT/JP2011/076054 mailed on Dec. 27, 2011.
(Continued)

*Primary Examiner* — Kevin Bates
*Assistant Examiner* — Chen-Liang Huang

(57) ABSTRACT

It is an object of the present invention to reduce a work load in setting a violation sign condition. A violation sign condition setting supporting system includes a violation-condition-similarity calculating unit 11 configured to calculate similarity between a violation condition for a set monitoring target system and a violation condition for another monitoring target system, a monitoring-data-similarity calculating unit 13 configured to calculate similarity between monitoring data of the set monitoring target system and monitoring data of the other monitoring target system, a first similarity determining unit 12 and a second similarity determining unit 14 configured to determine, on the basis of the similarity calculated by the violation-condition-similarity calculating unit 11 and the similarity calculated by the monitoring-data-similarity calculating unit 13, whether the violation sign condition for the other monitoring target system can be applied to setting of the violation sign condition for the set monitoring target system, and a screen generating and displaying unit 15 configured to cause a monitoring apparatus 3 to display the violation sign condition for the other monitoring target system determined as being able to be applied to the setting of the violation sign condition for the set monitoring target system.

5 Claims, 8 Drawing Sheets

(51) Int. Cl.
*G06F 11/07* (2006.01)
*H04L 12/26* (2006.01)

(56) References Cited

FOREIGN PATENT DOCUMENTS

| JP | 2009176203 A | 8/2009 |
|---|---|---|
| JP | 2009289221 A | 12/2009 |
| WO | 2009144780 A1 | 12/2009 |

OTHER PUBLICATIONS

Takeshi Matsumura, 'Tokushu: SLA to Service Level Kanri', [online], Apr. 8, 2004, IT Media Kabushiki Kaisha, [retrieval date Dec. 14, 2011], internet <URL:http://web.archieve.org/web/20040417203329/http://www.atmarkit.co.jp/fnetwork/tokusyuu/24sla/01.html>.

* cited by examiner

Fig. 4

VIOLATION SIGN CONDITION SETTING SCREEN

| APPLICABILITY | VIOLATION SIGN CONDITION | REGISTRATION RESULT |
|---|---|---|
| ☐ | OPERATING RATIO>99.95% | PRESENT |
| ☐ | COMPLIANCE RATIO OF AVERAGE RESPONSE TIME >97.5% | ABSENT (SIMILAR CONDITION IS PRESENT) |
| ... | ... | ... |

[CORRECT]

Fig. 5

VIOLATION SIGN CONDITION SETTING SUPPORTING SCREEN

| MONITORING TARGET SYSTEM NAME | MONITORING APPARATUS NAME | VIOLATION SIGN CONDITION | |
|---|---|---|---|
| MONITORING TARGET SYSTEM B1 | MONITORING APPARATUS B | OPERATING RATIO>99.95%<br>COMPLIANCE RATIO OF AVERAGE RESPONSE TIME >97.5% | DETAIL |
| MONITORING TARGET SYSTEM C3 | MONITORING APPARATUS C | OPERATING RATIO>99.95%<br>COMPLIANCE RATIO OF AVERAGE RESPONSE TIME >95% | DETAIL |
| ... | ... | ... | ... |

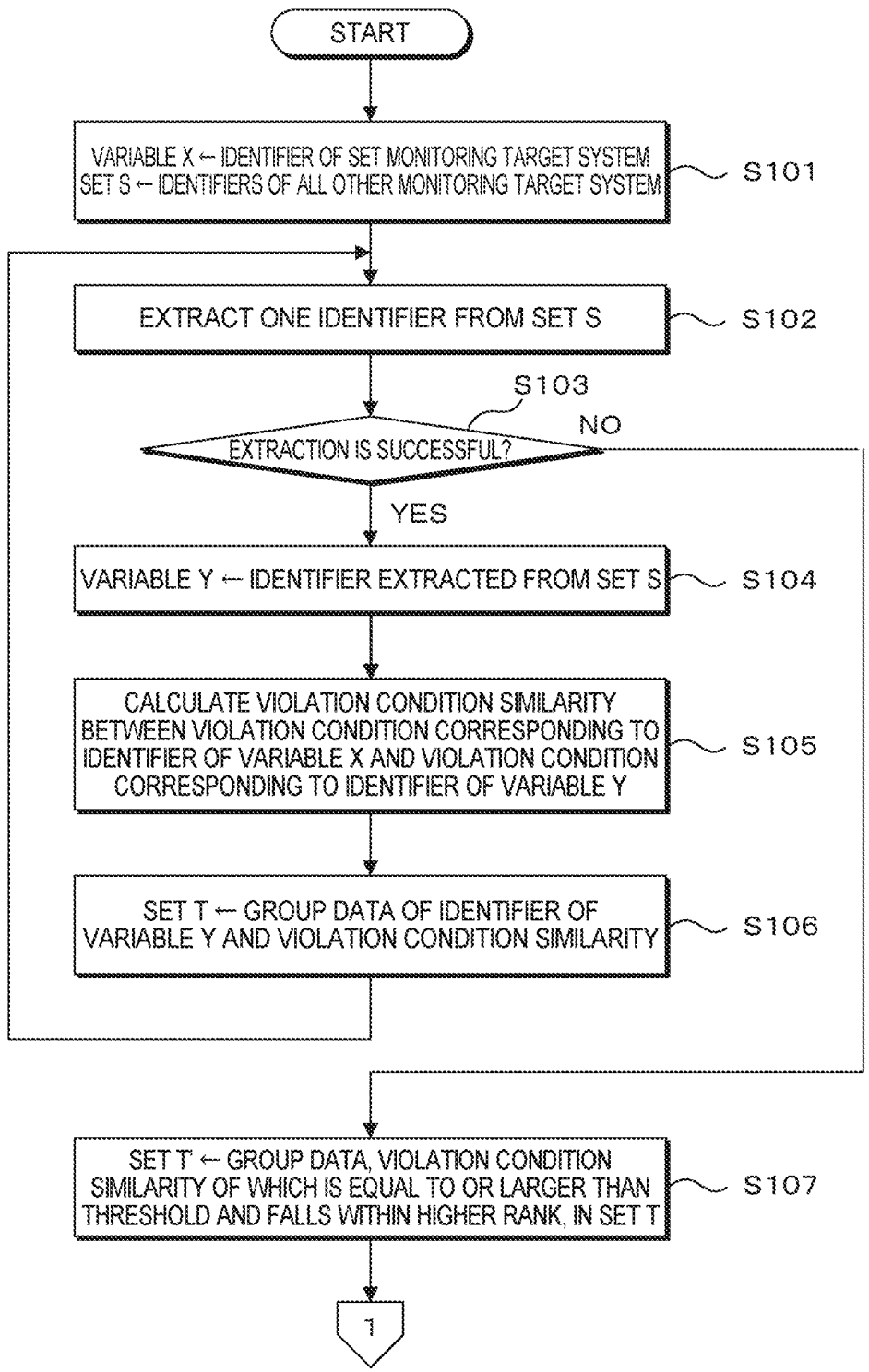

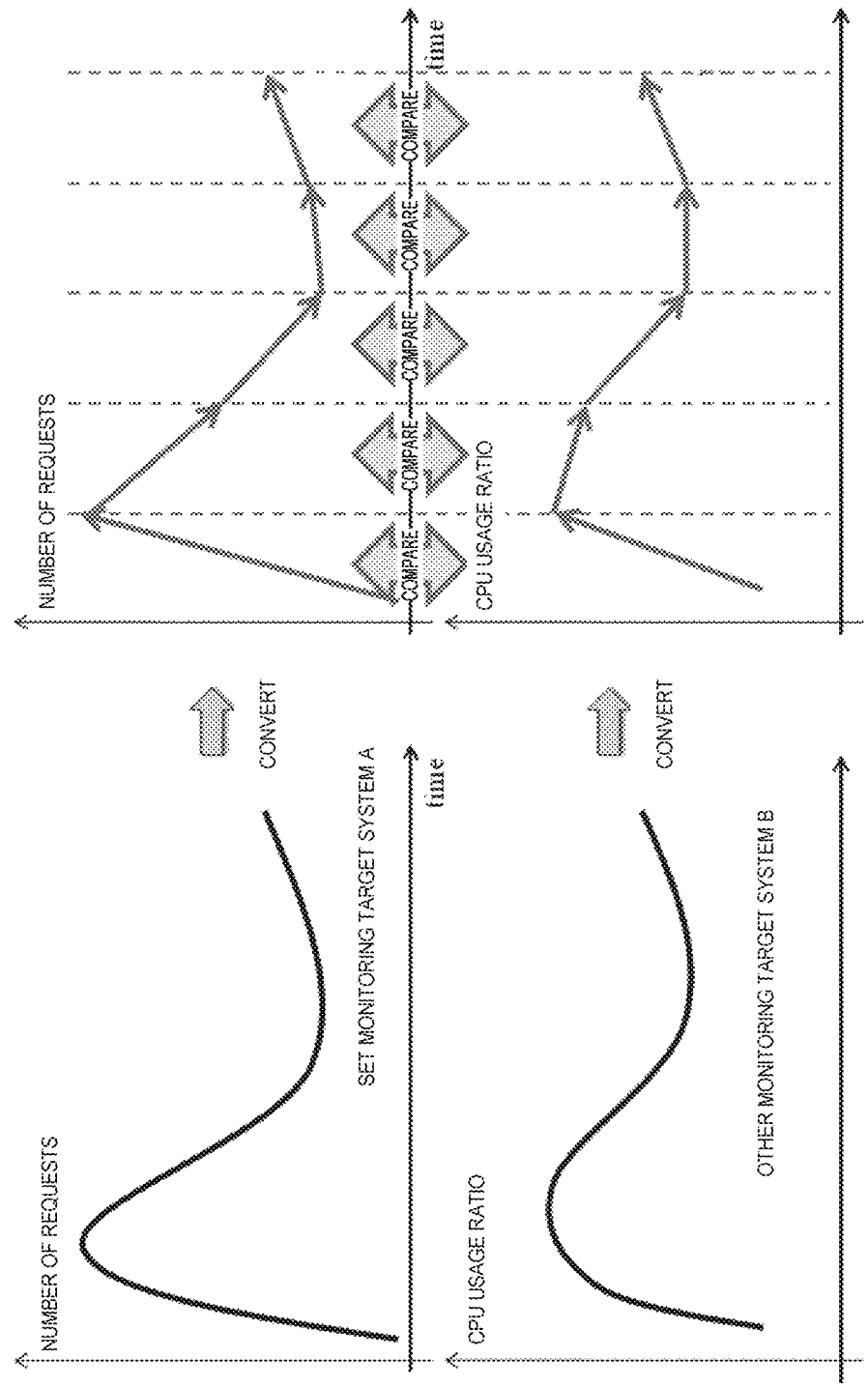

VIOLATION SIGN CONDITION SETTING SUPPORTING SYSTEM, VIOLATION SIGN CONDITION SETTING SUPPORTING METHOD, AND VIOLATION SIGN CONDITION SETTING SUPPORTING PROGRAM

BACKGROUND

The present invention relates to a violation sign condition setting supporting system, a violation sign condition setting supporting method, and a violation sign condition setting supporting program.

In a data center where a large number of IT apparatuses such as servers, routers, switching hubs, and storages are installed, a platform service provider provides, as a service through a network, a customer desiring to use an IT apparatus with a server system to which a server and a storage are connected via a router and a switching hub. In the data center, changes of system configurations such as a software configuration and a server configuration of the server system, a network configuration, and a storage configuration are frequently performed according to, for example, introduction of a virtualization technology.

On the other hand, operation management for continuously providing stable processing is requested for the server system. Therefore, the platform service provider enters into, with the customer, a service level agreement for setting target values of an operating ratio, processing performance, an environmental load, and the like of the IT apparatus as service levels and performs operation management to maintain the service levels. Target values such as an operating ratio equal to or higher than 99.95%, a compliance ratio of an average response time equal to or higher than 90%, a compliance ratio of power usage efficiency equal to or higher than 80% are examples of the service levels. The platform service provider needs to accurately detect a sign of service level violation as early as possible and quickly take measures in order to maintain the service levels.

Patent Document 1 discloses a technique in which, when a transition of monitoring data deviates from a range obtained as a result of a statistic processing of monitoring data in the past, the transition of the monitoring data is set as a violation sign. Patent Document 2 discloses a technique in which monitoring data, a rate of coincidence of which with monitoring data of service level violation reaches or exceeds a threshold, is set as a violation sign.

Patent Document 1: Patent Publication JP-A-2005-285040
Patent Document 2: Patent Publication JP-A-2009-289221

In the technique disclosed in Patent Document 1, all transitions of monitoring data different from normal monitoring data are set as violation signs. Therefore, for example, in a server system at an initial stage when statistic processing of monitoring data is not decided or a transitional period stage when a periodical violation occurs and a server system in which monitoring data substantially fluctuates and a statistic result is unstable, erroneous determination in which monitoring data is determined as a violation sign by mistake often occurs. In order to reduce errors of violation signs and improve accuracy of the violation signs, it is necessary to appropriately set a statistic processing method and violation sign conditions for monitoring data. However, when it is attempted to appropriately set the statistic processing method and the violation sign conditions for monitoring data, trial and error for, for example, repeatedly performing various tests is involved. Therefore, a long work period and large work man-hour are required.

In the technique disclosed in Patent Document 2, if the threshold for the rate of coincidence is set too high, this causes overlooking of a violation sign. If the threshold for the rate of coincidence is set too low, this causes an increase in erroneous determination in which monitoring data is determined as a violation sign by mistake. In order to reduce errors of violation signs and improve accuracy of the violation signs, it is necessary to appropriately set the threshold for the rate of coincidence. However, when it is attempted to appropriately set the threshold for the rate of coincidence, trial and error for, for example, repeatedly performing various tests is involved. Therefore, a long work period and large work man-hour are required.

SUMMARY

The present invention has been devised in order to solve the problems and it is an object of the present invention to provide a violation sign condition setting supporting system, a violation sign condition setting supporting method, and a violation sign condition setting supporting program that can reduce a work load in setting a violation sign condition.

A violation sign condition setting supporting system according to the present invention is a violation sign condition setting supporting system that supports setting of a violation sign condition for determining whether a state occurs in which a sign of service level violation appears, the violation sign condition setting supporting system including: a first similarity calculating unit configured to calculate similarity between a violation condition for determining whether a violation state of a service level occurs, with this violation condition being requested in a target system in which the violation sign condition is to be set, and the violation condition requested in another system other than the target system; a second similarity calculating unit configured to calculate similarity between monitoring data used for the violation condition and the violation sign condition in the target system and the monitoring data in the other system; a determining unit configured to determine, on the basis of the similarity calculated by the first similarity calculating unit and the similarity calculated by the second similarity calculating unit, whether the violation sign condition set in the other system can be applied to the setting of the violation sign condition for the target system; and a display control unit configured to implement display of the violation sign condition set in the other system determined by the determining unit as being able to be applied to the setting of the violation sign condition for the target system.

A violation sign condition setting supporting method according to the present invention is a violation sign condition setting supporting method of controlling a violation sign condition setting supporting system that supports setting of a violation sign condition for determining whether a state occurs in which a sign of service level violation appears, the violation sign condition setting supporting method including: a first similarity calculating step of calculating similarity between a violation condition for determining whether a violation state of a service level occurs, with this violation condition being requested in a target system in which the violation sign condition is to be set, and the violation condition requested in another system other than the target system; a second similarity calculating step of calculating similarity between monitoring data used for the violation condition and the violation sign condition in the target system and the monitoring data in the other system; a determining step of determining, on the basis of the similarity calculated in the first similarity calculating step and the similarity calculated in the second similarity calculating step, whether the violation sign condition set in the other system can be applied to the setting of the violation sign condition for the target system; and a display control step of implementing display of the violation sign condition set in the other system determined in the determining step as being able to be applied to the setting of the violation sign condition for the target system.

A violation sign condition setting supporting program according to the present invention causes a computer to execute the steps included in the violation sign condition setting supporting method.

According to the present invention, it is possible to reduce a work load in setting a violation sign condition.

DESCRIPTION OF THE DRAWINGS

FIG. 4 is a diagram illustrating a display screen of a violation sign condition setting screen.

FIG. 5 is a diagram illustrating a display screen of a violation sign condition setting supporting screen.

FIG. 6 is a flowchart (No. 1) for explaining the operation of the violation sign condition setting supporting system in the embodiment.

FIG. 8 is a diagram for explaining a method of calculating the similarity of monitoring data in a first modification.

DETAILED DESCRIPTION

A preferred embodiment of a violation sign condition setting supporting system, a violation sign condition setting supporting method, and a violation sign condition setting supporting program according to the present invention is explained below with reference to the accompanying drawings. The violation sign condition setting supporting system, the violation sign condition setting supporting method, and the violation sign condition setting supporting program according to the present invention support setting work for violation sign conditions in a monitoring target system in which a system configuration is changed. The violation sign conditions are conditions for determining whether a state occurs in which a sign of service level violation appears in the monitoring target system.

Figure 1:
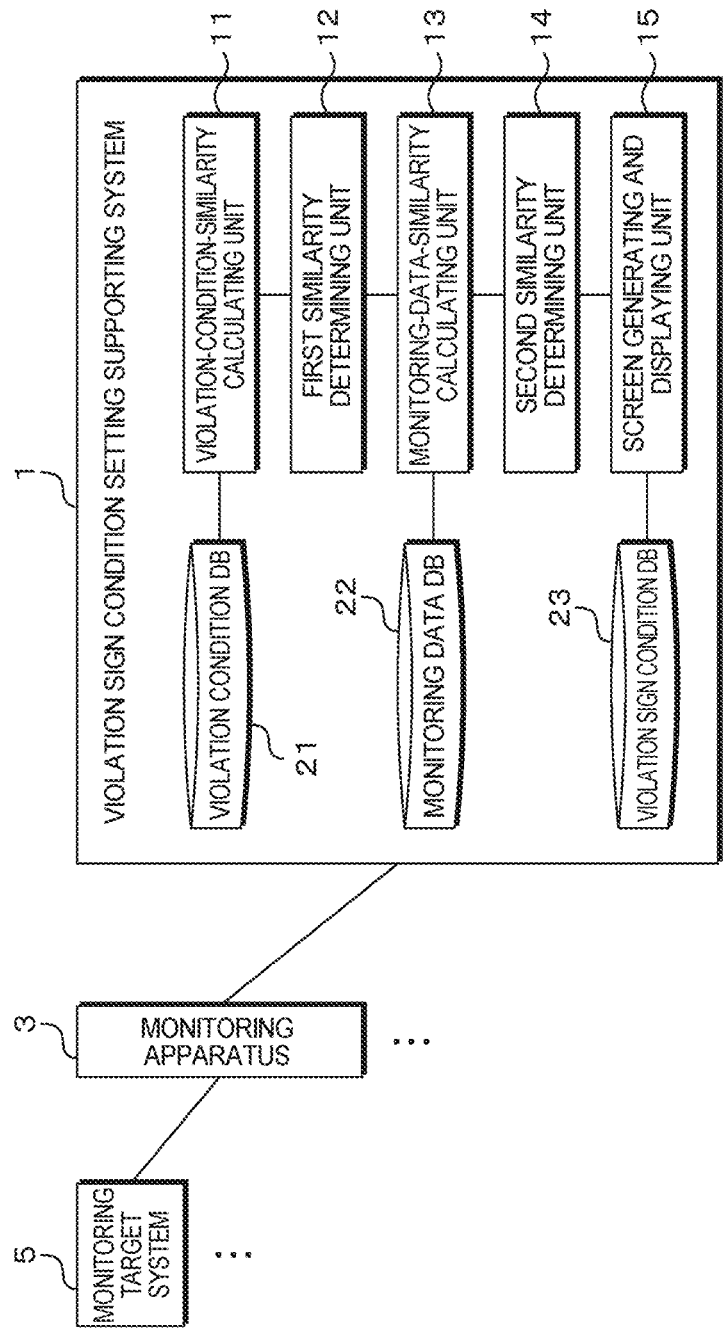
FIG. 1 is a block diagram illustrating the configuration of a violation sign condition setting supporting system in an embodiment.

First, the configuration of a violation sign condition setting supporting system in an embodiment is explained with reference to FIG. 1. As shown in FIG. 1, a violation sign condition setting supporting system 1 is connected to one or a plurality of monitoring apparatuses 3 via a network such as a LAN. The monitoring apparatus 3 is an apparatus that monitors states of one or a plurality of monitoring target systems 5.

The monitoring apparatus 3 includes a data collecting unit that collects monitoring data from the monitoring target system 5, a violation determining unit that determines whether the monitoring target system 5 is in a violation state of service levels, a violation-sign-condition estimating unit that estimates violation sign conditions for the monitoring target system 5 from the monitoring data and a determination result of the violation state of the monitoring target system 5, a violation-sign determining unit that determines whether the monitoring target system 5 is in a violation sign state, and a notifying unit that notifies an administrator that the monitoring target system 5 is in the violation state or the violation sign state.

The monitoring target system 5 is a server system in which a plurality of servers and storages are connected via routers and switching hubs. The monitoring target system 5 includes, for example, a Web server, a Web AP (Web application) server, a DB (database) server, and a storage. The Web server is a server that forms an interface with a computer of a user. The Web AP server is a server that processes an application program provided by a web site. The DB server is a database server that refers to, retrieves, and updates data stored in the storage according to a request of the Web AP server. The storage is a storage device that stores data of the application program.

The violation sign condition setting supporting system 1 physically includes, for example, a CPU (Central Processing Unit), a storage device, and an input and output interface. The storage device includes, for example, components such as a ROM (Read Only Memory) and a HDD (Hard Disk Drive) that stores programs and data processed by the CPU and a RAM (Random Access Memory) mainly used as various work areas for control processing. These components are connected to one another via a bus. The CPU can realize functions of units explained below by executing the programs stored in the ROM and processes messages received via the input and output interface and data expanded in the RAM.

As shown in FIG. 1, the violation sign condition setting supporting system 1 functionally includes, for example, a violation-condition-similarity calculating unit 11, a first similarity determining unit 12, a monitoring-data-similarity calculating unit 13, a second similarity determining unit 14, and a screen generating and displaying unit 15. Further, the violation sign condition setting supporting system 1 includes a violation condition database 21, a monitoring data database 22, and a violation sign condition database 23 referred to by the units.

The violation-condition-similarity calculating unit 11 calculates each of similarities between violation conditions requested in the monitoring target system 5 set as a setting target of violation sign conditions (hereinafter referred to as "set monitoring target system") and violation conditions requested in another monitoring target system other than the set monitoring target system (hereinafter referred to "other monitoring system"). The violation conditions are conditions for determining whether a violation state of service levels occurs. For example, conditions such as an operating ratio equal to or higher than 99.95%, a compliance ratio of an average response time equal to or higher than 90%, and a compliance ratio of power usage efficiency equal to or higher than 80% are relevant to the service levels.

The similarity of the violation conditions is calculated using, for example, a similarity calculating method for sets such as a Jaccard coefficient, a Dice coefficient, or a Simpson's coefficient or a vector similarity calculating method such as cosine similarity, a Pearson correlation coefficient, and the like.

A specific example in which similarity is calculated using the Jaccard coefficient is explained. For example, it assumed that, in a set monitoring target system A, as violation conditions, four conditions are set, i.e., an operating ratio is equal to or higher than 99.9%, a compliance ratio of a response time at normal time is equal to or higher than 95%, a compliance ratio of a response time at peak time is equal to or higher than 90%, and a compliance ratio of power usage efficiency is equal to or higher than 80% and, in the other monitoring target system B, as violation conditions, three conditions are set, i.e., an operating ratio is equal to or higher than 99.9%, a compliance ratio of a response time at normal time is equal to or higher than 90%, and a compliance ratio of power usage efficiency is equal to or higher than 80%.

Similarity in this case is "2/(7−2)=0.4". In other words, similarity is calculated by dividing "2", which is the number of violation conditions common to the set monitoring target system A and the other monitoring target system B, by "5", which is a value obtained by subtracting "2", which is the number of violation conditions common to the set monitoring target system A and the other monitoring target system B, from "7", which is a total number of the violation conditions for the set monitoring target system A and the other monitoring target system B.

The first similarity determining unit 12 determines whether the similarity calculated by the violation-condition-similarity calculating unit 11 is equal to or larger than a first threshold and/or the similarity falls within a range from the top to a first rank. The first similarity determining unit 12 extracts, as a first candidate, the other monitoring target system that satisfies this condition.

An administrator can set the first threshold and the first rank as appropriate according to experiments and the like. For example, as the first threshold, a lower limit value in a range in which violation conditions are similar to each other can be set according to content of similarity calculated by the violation-condition-similarity calculating unit 11. As the first rank, a rank of non-exclusion of violation sign conditions applicable to at least the set monitoring target system can be set.

The monitoring-data-similarity calculating unit 13 calculates each of similarities between monitoring data of the other monitoring system extracted as the first candidate and monitoring data of the set monitoring target system. The monitoring data is time-series data usable as determination elements in determining violation conditions and violation sign conditions in the monitoring target system. For example, data related to service levels such as an operating ratio, an average response time, and power usage efficiency, data indicating operation states such as propriety of operation and propriety of communication of hardware and software, data indicating resource states of a server such as a CPU usage ratio, the number of times of DISK input and output, a DISK free space, and memory usage, and data indicating network performance such as the number of requests, a line usage ratio, a package discard ratio, and the number of error packets are relevant to the monitoring data.

Figure 2:
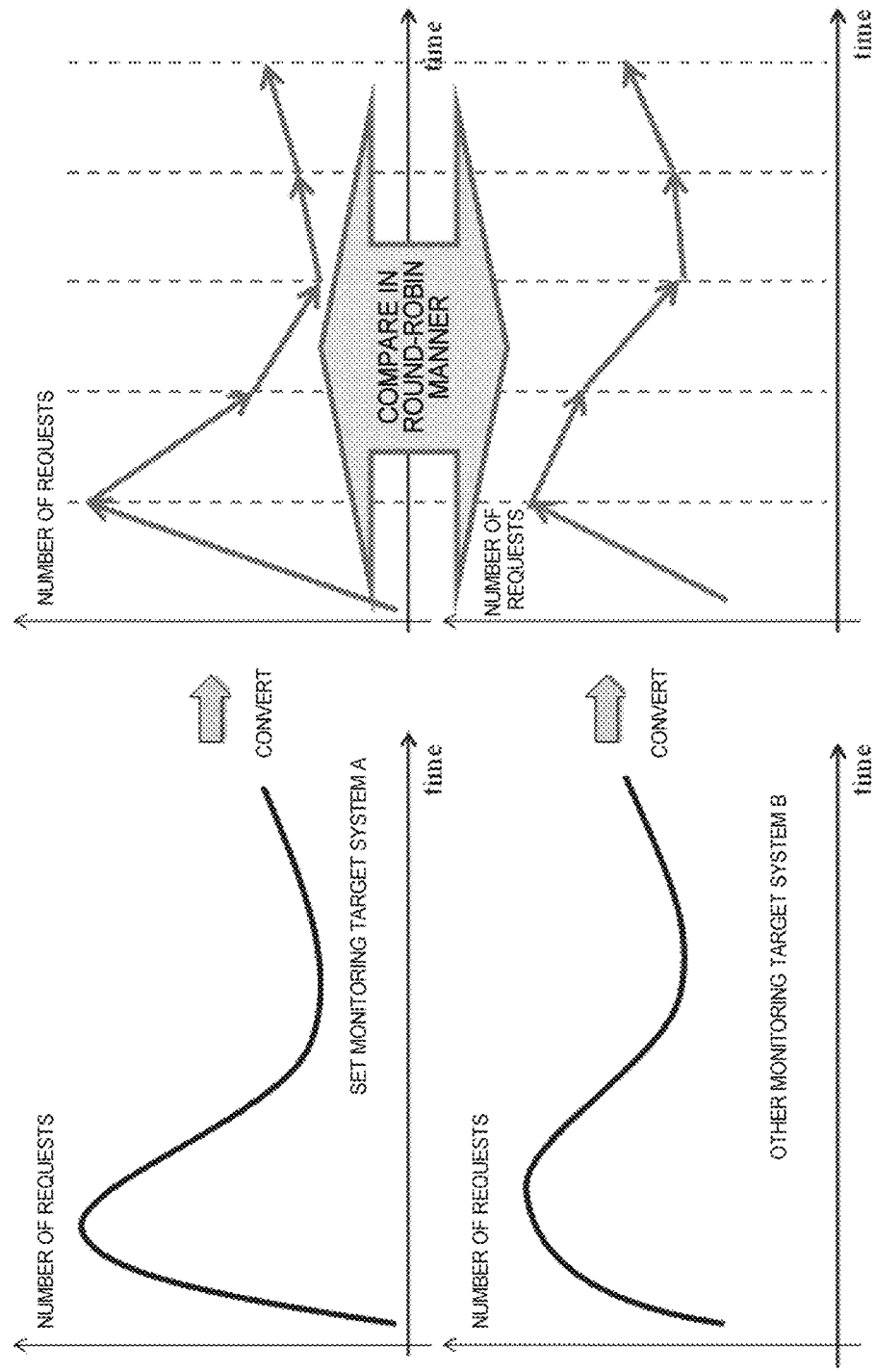
FIG. 2 is a diagram for explaining a method of calculating the similarity of monitoring data.

The similarity of monitoring data is calculated by, for example, as shown in FIG. 2, converting time-series monitoring ratio into a vector sequence for each predetermined time and comparing all combinations of vector sequences of two monitoring target systems using the vector similarity calculating method such as the cosine similarity or the Pearson correlation coefficient.

A specific example in which similarity is calculated using the cosine similarity is explained. The cosine similarity is calculated using Expression (1) or Expression (2) below.

In the case of $\theta \leq (\pi/2)$

[Math. 1]

$$Sim(\vec{a}_i, \vec{b}_j) = \cos\theta = \frac{\vec{a}_i \cdot \vec{b}_j}{|\vec{a}_i||\vec{b}_j|} \qquad \text{Expression (1)}$$

In the case of $\theta > (\pi/2)$

[Math. 2]

$$Sim(\vec{a}_i, \vec{b}_j) = 0 \qquad \text{Expression (2)}$$

Figure 3:
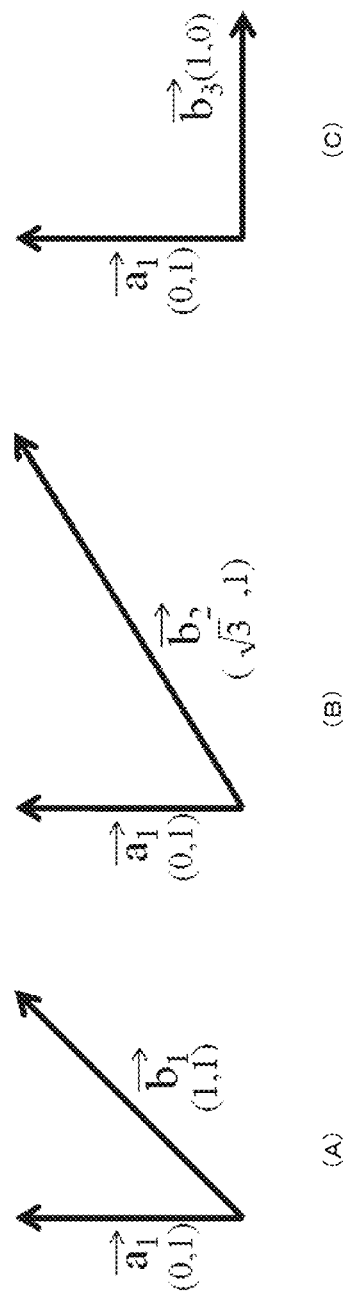
FIG. 3 is a diagram for explaining a method of calculating the similarity of monitoring data.

For example, as shown in FIG. 3(A), when a vector sequence $a_1$ of the set monitoring target system A is (0, 1) and a vector sequence $b_1$ of the other monitoring target system B is (1, 1), $\theta$ is "$\pi/4$". From Expression (1), similarity is "0.71". As shown in FIG. 3(B), when the vector sequence $a_1$ of the set monitoring target system A is (0, 1) and a vector sequence $b_2$ of the other monitoring target system B is ($\sqrt{3}$, 1), $\theta$ is "$\pi/3$". From Expression (1), similarity is "0.5". As shown in FIG. 3(C), when the vector sequence $a_1$ of the set monitoring target system A is (0, 1) and a vector sequence $b_3$ of the other monitoring target system B is (1, 0), $\theta$ is "$\pi/2$". From Expression (1), similarity is "0".

The second similarity determining unit 14 shown in FIG. 1 determines whether the similarity calculated by the monitoring-data-similarity calculating unit 13 is equal to or larger than a second threshold and/or the similarity falls within a range from the top to a second rank. The second similarity determining unit 14 determines that violation sign conditions set in the other monitoring target system satisfying this condition can be applied to setting of violation sign conditions for the set monitoring target system.

The administrator can set the second threshold and the second rank as appropriate according to experiments and the like. For example, as the second threshold, a lower limit value in a range in which monitoring data are similar to each other can be set according to content of similarity calculated by the monitoring-data-similarity calculating unit 13. As the second rank, a rank of non-exclusion of a violation sign conditions applicable to at least the set monitoring target system can be set.

The screen generating and displaying unit 15 generates various screens for displaying, as candidates of violation sign conditions to be set in the set monitoring target system, violation sign conditions set in the other monitoring target system determined by the second similarity determining unit 14 as being able to be applied to the setting of violation sign conditions for the set monitoring target system. The screen generating and displaying unit 15 causes a display (a display apparatus) of the monitoring apparatus 4 that monitors the set monitoring target system, for example, to display the generated various screens.

Various screens generated by the screen generating and displaying unit 15 are explained with reference to FIGS. 4 and 5. FIG. 4 is a violation sign condition setting screen and FIG. 5 is a violation sign condition setting supporting screen. A system configuration is changed in the monitoring target system A monitored by a monitoring apparatus A. The screens are explained as screen examples displayed when violation sign conditions for the monitoring target system A are reset.

The violation sign condition setting screen shown in FIG. 4 includes applicability spaces, violation sign condition spaces, and registration result spaces. In each of the applicability spaces, a selection space for selecting whether a violation sign condition displayed in the violation sign condition space in the same row is applied to a violation sign condition for the monitoring target system A.

In each of the violation sign condition spaces, one of violation sign conditions for the monitoring target system A set by the administrator is displayed. The violation sign condition displayed in each of the violation sign condition space can be reset on a correction screen (not shown in the figure) to which the violation sign condition setting screen can be transitioned according to depression of a correction button.

In each of the registration result spaces, it is displayed whether a violation sign condition same as a violation sign condition displayed in the violation sign condition space in the same row is registered in the other monitoring target system. When "present" or "similar condition is present" is displayed in the registration result space, a link for transitioning to the violation sign condition setting supporting screen shown in FIG. 5 is embedded.

At a link destination of "present", violation sign conditions for a monitoring target system in which a violation sign condition same as a violation sign condition displayed in the violation sign condition space in the same row as "present" is set are displayed as a list. At a link destination of "similar condition is present", violation sign conditions for a monitoring target system in which a violation sign condition similar to a violation sign condition displayed in the violation sign condition space in the same row as "similar condition is present" is set are displayed as a list.

The violation sign condition setting supporting screen shown in FIG. 5 includes a monitoring target system name space, a monitoring apparatus name space, a violation sign condition space, and a detail button space. In the monitoring target system name space, a name for identifying a monitoring target system is displayed. In the monitoring apparatus name space, a name for identifying a monitoring apparatus is displayed. In the violation sign condition space, violation sign conditions set in a monitoring target system displayed in the monitoring target system name space in the same row are displayed. The detail button space is a button for displaying, for example, on a popup screen, monitoring condition similarity and monitoring data similarity between a monitoring target system displayed in the monitoring system displayed in the monitoring target system name space in the same row and the monitoring target system A.

Display contents of the violation sign condition setting supporting screen shown in FIG. 5 are display contents transitioned from "present" displayed in the registration result space of the violation sign condition setting screen shown in FIG. 4. A violation sign condition "operating ratio>99.95%" is displayed in the violation sign condition space in the same row as "present" shown in FIG. 4. Therefore, on the violation sign condition setting supporting screen shown in FIG. 5, violation sign conditions for a monitoring target system in which "operating ratio>99.95%" is set in the violation sign condition are displayed as a list.

Figure 7:
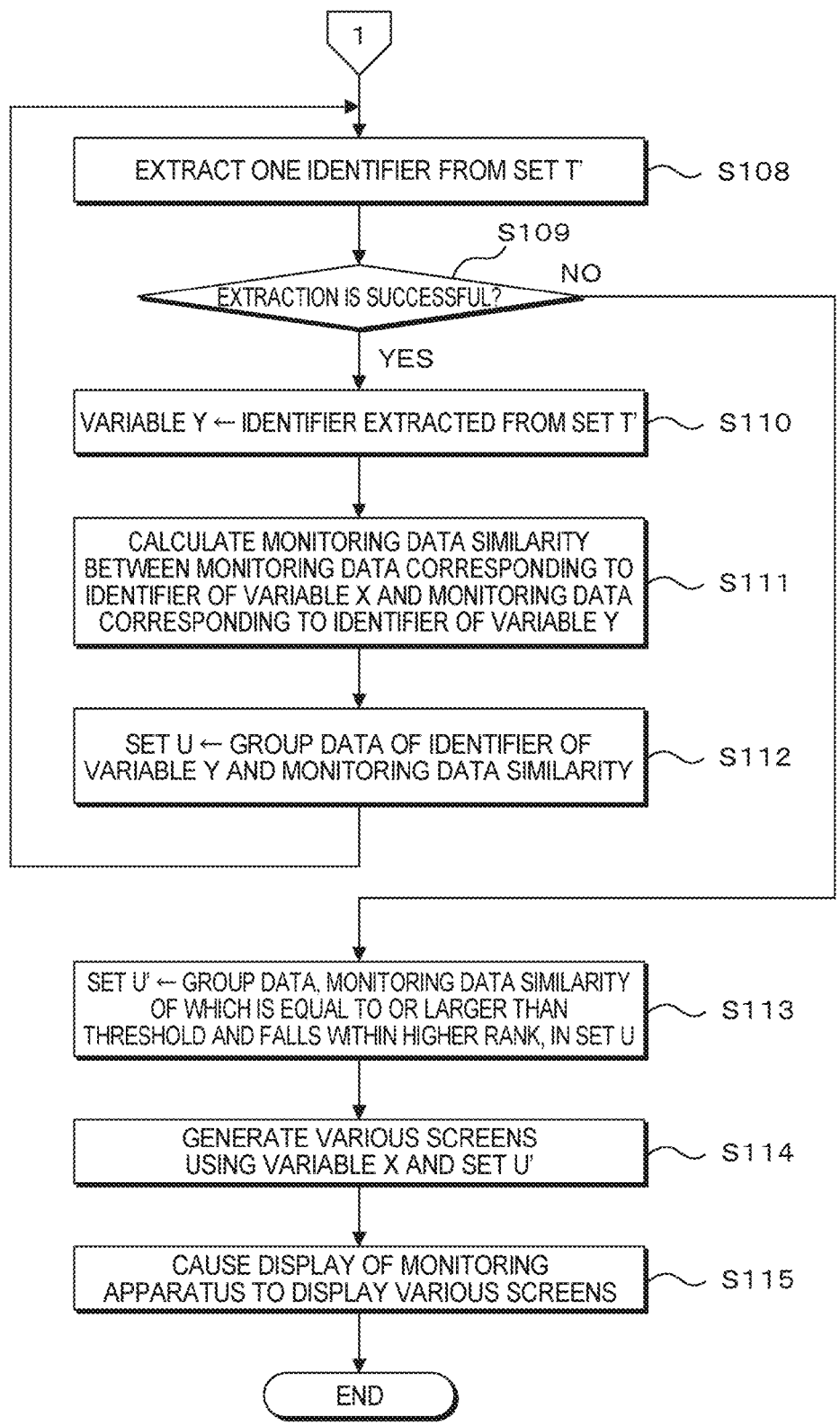
FIG. 7 is a flowchart (No. 2) for explaining the operation of the violation sign condition setting supporting system in the embodiment.

The operation of the violation sign condition setting supporting system in the embodiment is explained with reference to FIGS. 6 and 7. For example, when a violation condition or a system configuration is changed in any one of the monitoring target systems 5, which can communicate with the violation sign condition setting supporting system 1, this operation is started according to detection of the change by the violation sign condition setting supporting system 1.

First, the violation sign condition setting supporting system 1 stores, in a variable X, an identifier of the set monitoring target system in which a violation condition or a system configuration is changed and stores, in a set S, identifiers of all the other monitoring target systems other than the set monitoring target system (step S101).

Subsequently, the violation-condition-similarity calculating unit 11 of the violation sign condition setting supporting system 1 extracts one of the identifiers of the other monitoring target systems from the set S (step S102). When the identifier cannot be extracted from the set S, i.e., when no identifier to be extracted from the set S is present (NO in step S103), the violation-condition-similarity calculating unit 11 shifts to step S107 explained below.

On the other hand, when the identifier can be extracted from the set S (YES in step S103), the violation-condition-similarity calculating unit 11 stores, in a variable Y, the extracted identifier of the other monitoring target system (step S104).

Subsequently, the violation-condition-similarity calculating unit 11 calculates similarity between a violation condition acquired from the violation condition database 21 using, as a search key, the identifier of the set monitoring target system stored in the variable X and a violation condition acquired from the violation condition database 21 using, as a search key, the identifier of the other monitoring target system stored in the variable Y (step S105).

Subsequently, the violation-condition-similarity calculating unit 11 stores, in a set T, as a group, the identifier of the other monitoring target system stored in the variable Y and the violation condition similarity calculated in step S105 (step S106). The violation-condition-similarity calculating unit 11 shifts to step S102 explained above.

Subsequently, the first similarity determining unit 12 rearranges, in descending order of violation condition similarities, group data stored in the set T. The first similarity determining unit 12 extracts group data, the violation condition similarities of which are equal to or larger than a first threshold (e.g., 0.8) and fall within a range from the top to a first rank (e.g., a tenth place) and stores the group data in a set T' (step S107).

Subsequently, the monitoring-data-similarity calculating unit 13 extracts one of the identifiers of the other monitoring target system from the set T' (step S108). When the identifier can be extracted from the set T' (YES in step S109), the monitoring-data-similarity calculating unit 13 stores, in the variable Y, the extracted identifier of the other monitoring target system (step S110).

Subsequently, the monitoring-data-similarity calculating unit 13 calculates similarity between monitoring data acquired from the monitoring data database 22 using, as a search key, the identifier of the set monitoring target system stored in the variable X and monitoring data acquired from the monitoring data database 22 using, as a search key, the identifier of the other monitoring target system stored in the variable Y (step S111).

Subsequently, the monitoring-data-similarity calculating unit 13 stores, in a set U, as a group, the identifier of the other monitoring target system stored in the variable Y, the violation condition similarity calculated in step S105, and the monitoring data similarity calculated in step S111 (step S112). The monitoring-data-similarity calculating unit 13 returns to step S108 explained above.

On the other hand, when the identifier cannot be extracted from the set T' in the determination in step S109, i.e., no identifier to be extracted from the set T' is present (NO in step S109), the second similarity determining unit 14 rearranges, in descending order of monitoring data similarities, group data stored in the set U. The second similarity determining unit 14 extracts group data, the monitoring data similarities of which are equal to or larger than a second threshold (e.g., 0.8)

and fall within a range from the top to a second rank (e.g., a tenth place) and stores the group data in a set U' (step S113).

Subsequently, the screen generating and displaying unit 15 generates, using the variable X and the set U', the violation sign condition setting screen shown in FIG. 4 and the violation sign condition setting supporting screen shown in FIG. 5 (step S114) and causes a display of the monitoring apparatus 4, which monitors the set monitoring target system, to display the violation sign condition setting screen and the violation sign condition setting supporting screen (S115).

As explained above, with the violation sign condition setting supporting system 1 in the embodiment, when a violation condition or a system configuration of the monitoring target system is changed, it is possible to present, to the administrator, violation sign conditions set in the other monitoring target system having violation conditions and monitoring data same as or similar to violation conditions and monitoring data of the set monitoring target system.

Consequently, the administrator can verify appropriateness of violation sign conditions to be set in the set monitoring target system in which the violation condition or the system configuration is changed while referring to the violation sign conditions set in the other monitoring target system having the same or similar violation conditions and monitoring data. Therefore, it is possible to reduce a work load in setting the violation sign condition for the monitoring target system in which the violation condition or the system configuration is changed.

Modifications

The embodiment explained above is only an illustration and is not intended to exclude the application of various modifications and technique not clearly described in the embodiment. In other words, the present invention can be modified and carried out in various forms without departing from the spirit of the present invention.

First Modification

In the embodiment explained above, the method of comparing all the combinations of the vector sequences of the two monitoring target system using the vector similarity calculating method (see FIG. 2) is explained as the specific example in calculating the similarity of monitoring data. However, a method of calculating the similarity of monitoring data is not limited to this. For example, before the similarity of monitoring data is calculated, the monitoring data for which similarity is calculated may be filtered and deleted. Specifically, the similarity of monitoring data may be calculated using only monitoring data in an invariable relation with monitoring data of the set monitoring target system. The invariable relation means a relation having a degree of correlation equal to or larger than a predetermined threshold.

The monitoring data in the invariable relation can be extracted, for example as explained below. First, as shown in FIG. 8, time-series monitoring data of the set monitoring target system A and the other monitoring target system B are respectively converted into vector sequences for each predetermined time. Subsequently, among combinations of the vector sequences of the two monitoring target system, only combinations of the vector sequences in the same period of time are compared using the vector similarity calculating method such as the cosine similarity or the Pearson correlation coefficient to calculate similarity. Subsequently, when the calculated similarity is equal to or larger than the predetermined threshold, it is determined that the monitoring data are in the invariable relation. The monitoring data are extracted as target data in calculating the similarity of monitoring data. In this extraction, only the combinations of the vector sequences in the same period of time are compared to calculate similarity. Therefore, it is possible to substantially reduce a processing time compared with a processing time for comparing all the combinations of the vector sequences to calculate similarity as explained in the embodiment.

Therefore, according to the first modification, it is possible to filter and reduce processing targets in calculating the similarity of monitoring data. Therefore, it is possible to reduce time required in calculating the similarity of monitoring data. Consequently, when a violation condition or a system configuration of the monitoring target system is changed, it is possible to quickly present reference candidate violation sign conditions to the administrator. Therefore, it is possible to reduce a work load in setting violation sign conditions for the monitoring target system in which the violation condition or the system configuration is changed.

Second Modification

In the embodiment explained above, violation condition similarity and monitoring data similarity are calculated again for all data every time a violation condition or a system configuration is changed. However, the present invention is not limited to this. For example, data at the time when violation condition similarity and monitoring data similarity are calculated may be stored as a history. When violation condition similarity and monitoring data similarity are calculated, the history may be referred to. If it is found that the violation condition similarity and the monitoring data similarity are already calculated, calculation processing for similarity may be skipped and omitted.

Consequently, since it is possible to reduce time required for calculation of similarity, it is possible to reduce time for presenting reference candidate violation sign conditions to the administrator. Therefore, it is possible to reduce a work load in setting violation sign conditions for the monitoring target system in which the violation condition or the system configuration is changed.

A part of the embodiment or the entire embodiment can also be described as indicated by the following notes. However, the present invention is not limited to the below.

(Note 1) A violation sign condition setting supporting system that supports setting of a violation sign condition for determining whether a state occurs in which a sign of service level violation appears, the violation sign condition setting supporting system including: a first similarity calculating unit configured to calculate similarity between a violation condition for determining whether a violation state of a service level occurs, with this violation condition being requested in a target system in which the violation sign condition is to be set, and the violation condition requested in another system other than the target system; a second similarity calculating unit configured to calculate similarity between monitoring data used for the violation condition and the violation sign condition in the target system and the monitoring data in the other system; a determining unit configured to determine, on the basis of the similarity calculated by the first similarity calculating unit and the similarity calculated by the second similarity calculating unit, whether the violation sign condition set in the other system can be applied to the setting of the violation sign condition for the target system; and a display control unit configured to implement display of the violation sign condition set in the other system determined by the determining unit as being able to be applied to the setting of the violation sign condition for the target system.

(Note 2) The violation sign condition setting supporting system described in Note 1, wherein the determining unit includes an extracting unit configured to extract, as a first candidate, the other system that satisfies a condition that the similarity calculated by the first similarity calculating unit is equal to or larger than a first threshold and/or the similarity falls within a range from a top to a first rank, and the second similarity calculating unit calculates similarity between the monitoring data of the other system extracted as the first candidate and the monitoring data of the target system.

(Note 3) The violation sign condition setting supporting system described in Note 2, wherein the determining unit determines that the violation sign condition set in the other system that satisfies a condition that the similarity calculated by the second similarity calculating unit is equal to or larger than a second threshold and/or the similarity falls within a range from the top to a second rank can be applied to setting of the violation sign condition for the target system.

(Note 4) A violation sign condition setting supporting method of controlling a violation sign condition setting supporting system that supports setting of a violation sign condition for determining whether a state occurs in which a sign of service level violation appears, the violation sign condition setting supporting method including: a first similarity calculating step of calculating similarity between a violation condition for determining whether a violation state of a service level occurs, with this violation condition being requested in a target system in which the violation sign condition is to be set, and the violation condition requested in another system other than the target system; a second similarity calculating step of calculating similarity between monitoring data used for the violation condition and the violation sign condition in the target system and the monitoring data in the other system; a determining step of determining, on the basis of the similarity calculated in the first similarity calculating step and the similarity calculated in the second similarity calculating step, whether the violation sign condition set in the other system can be applied to the setting of the violation sign condition for the target system; and a display control step of implementing display of the violation sign condition set in the other system determined in the determining step as being able to be applied to the setting of the violation sign condition for the target system.

(Note 5) A violation sign condition setting supporting program for causing a computer to execute the steps described in Note 4.

This application claims priority based on Japanese Patent Application No. 2010-256830 filed on Nov. 17, 2010, the entire contents of which are incorporated herein.

The violation sign condition setting supporting system, the violation sign condition setting supporting method, and the violation sign condition setting supporting program according to the present invention are suitable for reducing a work load in setting a violation sign condition.

1 violation sign condition setting supporting system
3 monitoring apparatus
5 monitoring target system
11 violation-condition-similarity calculating unit
12 first similarity determining unit
13 monitoring-data-similarity calculating unit
14 second similarity determining unit
15 screen generating and displaying unit
21 violation condition database
22 monitoring data database
23 violation sign condition database

I claim:

1. A violation sign condition setting supporting system that supports setting of a violation sign condition for determining whether a state occurs in which a sign of service level violation appears, the violation sign condition setting supporting system comprising:
   a processor; and
   memory for storing processor executable instructions that perform the steps in the following units:
   a first similarity calculating unit configured to calculate similarity between a violation condition for determining whether a violation state of a service level occurs, with this violation condition being requested in a target system in which the violation sign condition is to be set, and the violation condition requested in another system other than the target system;
   a second similarity calculating unit configured to calculate similarity between monitoring data used for the violation condition and the violation sign condition in the target system and the monitoring data in the other system;
   a determining unit configured to determine, on the basis of the similarity calculated by the first similarity calculating unit and the similarity calculated by the second similarity calculating unit, whether the violation sign condition set in the other system can be applied to the setting of the violation sign condition for the target system;
   a display control unit configured to implement display of the violation sign condition set in the other system determined by the determining unit as being able to be applied to the setting of the violation sign condition for the target system, as candidates for violation sign conditions to be set in the target system; and
   a setting unit configured to set the violation sign condition for the target system by accepting a selection instruction on whether or not the violation sign condition displayed as a candidate by the display control unit is applied to the violation sign condition for the target system.

2. The violation sign condition setting supporting system according to claim 1, wherein
   the determining unit includes an extracting unit configured to extract, as a first candidate, the other system that satisfies a condition that the similarity calculated by the first similarity calculating unit is equal to or larger than a first threshold and/or the similarity falls within a range from a top to a first rank, and
   the second similarity calculating unit calculates similarity between the monitoring data of the other system extracted as the first candidate and the monitoring data of the target system.

3. The violation sign condition setting supporting system according to claim 2, wherein the determining unit determines that the violation sign condition set in the other system that satisfies a condition that the similarity calculated by the second similarity calculating unit is equal to or larger than a second threshold and/or the similarity falls within a range from the top to a second rank can be applied to setting of the violation sign condition for the target system.

4. A violation sign condition setting supporting method of controlling a violation sign condition setting supporting system that supports setting of a violation sign condition for determining whether a state occurs in which a sign of service level violation appears, the violation sign condition setting supporting method comprising:
   a first similarity calculating step of calculating similarity between a violation condition for determining whether a violation state of a service level occurs, with this violation condition being requested in a target system in which the violation sign condition is to be set, and the violation condition requested in another system other than the target system;

a second similarity calculating step of calculating similarity between monitoring data used for the violation condition and the violation sign condition in the target system and the monitoring data in the other system;

a determining step of determining, on the basis of the similarity calculated in the first similarity calculating step and the similarity calculated in the second similarity calculating step, whether the violation sign condition set in the other system can be applied to the setting of the violation sign condition for the target system;

a display control step of implementing display of the violation sign condition set in the other system determined in the determining step as being able to be applied to the setting of the violation sign condition for the target system, as candidates for violation sign conditions to be set in the target system; and a setting unit configured to set the violation sign condition for the target system by accepting a selection instruction on whether or not the violation sign condition displayed as a candidate by the display control unit is applied to the violation sign condition for the target system.

5. A non-transitory computer readable medium storing a violation sign condition setting supporting program for causing a computer to execute the steps according to claim 4.

* * * * *